United States Patent
Yuan et al.

(10) Patent No.: US 12,187,630 B2
(45) Date of Patent: Jan. 7, 2025

(54) TREATMENT METHOD OF WASTEWATER CONTAINING FERRICYANIDE COMPLEX AND OXALATE

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN)

(72) Inventors: Qi Yuan, Guangdong (CN); Yali Qiu, Guangdong (CN); Yongqi Liu, Guangdong (CN); Genghao Liu, Guangdong (CN); Qinxue Gong, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO., LTD., Hunan (CN)

( * ) Notice: Subject to any disclaimer, the term of this patent is extended or adjusted under 35 U.S.C. 154(b) by 0 days.

(21) Appl. No.: 18/557,963

(22) PCT Filed: Mar. 15, 2023

(86) PCT No.: PCT/CN2023/081683
§ 371 (c)(1),
(2) Date: Oct. 30, 2023

(87) PCT Pub. No.: WO2023/231507
PCT Pub. Date: Dec. 7, 2023

(65) Prior Publication Data
US 2024/0270613 A1     Aug. 15, 2024

(30) Foreign Application Priority Data

May 31, 2022   (CN) .......................... 202210610685.6

(51) Int. Cl.
*C02F 1/00*     (2023.01)
*C02F 1/52*     (2023.01)
(Continued)

(52) U.S. Cl.
CPC ................ *C02F 1/56* (2013.01); *C02F 1/001* (2013.01); *C02F 1/5236* (2013.01); *C02F 1/66* (2013.01);
(Continued)

(58) Field of Classification Search
CPC .......... C02F 1/56; C02F 1/001; C02F 1/5236; C02F 1/66; C02F 9/00; C02F 2001/007;
(Continued)

(56) References Cited

U.S. PATENT DOCUMENTS 3,909,403 A * 9/1975 Abe .......................... B01J 41/07
430/431
4,708,804 A * 11/1987 Coltrinari ................. C02F 1/42
521/26
(Continued)

FOREIGN PATENT DOCUMENTS

| CN | 104843845 A | 8/2015 |
| CN | 113087115 A | 7/2021 |

(Continued)

OTHER PUBLICATIONS

English translation of Patent Publication CN 114380440A, published Apr. 22, 2022. (Year: 2022).*
(Continued)

*Primary Examiner* — Joseph W Drodge
(74) *Attorney, Agent, or Firm* — Yue (Robert) Xu; Apex Attorneys at Law, LLP

(57) ABSTRACT

Provided is a treatment method of waste water containing ferricyanide complex and oxalate, comprising under the condition of weak acidity to weak alkalinity, firstly adding an appropriate amount of divalent manganese ions to make the divalent manganese ions combined with ferrocyanide ions and part of oxalate ions in wastewater to form a mixed slag mainly composed of manganese ferrocyanide to achieve the purpose of removing most of the cyanide and a small amount of organic substance; adding excess divalent manganese ions to the first filtrate to make the divalent manganese ions fully combined with the oxalate in the wastewater to achieve the purpose of removing organic substance, and then adding an appropriate amount of alkali to the second filtrate to form precipitation to achieve the purpose of recovering manganese; then adding an appropriate amount of ferrous salt to achieve the purpose of removing the remaining cyanide and organic substance.

5 Claims, 1 Drawing Sheet

(51) Int. Cl.

| | | |
|---|---|---|
| C02F 1/56 | (2023.01) | |
| C02F 1/66 | (2023.01) | |
| C02F 9/00 | (2023.01) | |
| C02F 101/18 | (2006.01) | |
| C02F 101/20 | (2006.01) | |
| C02F 101/34 | (2006.01) | |

(52) U.S. Cl.
CPC .......... *C02F 9/00* (2013.01); *C02F 2001/007* (2013.01); *C02F 2101/18* (2013.01); *C02F 2101/203* (2013.01); *C02F 2101/34* (2013.01); *C02F 2301/08* (2013.01)

(58) Field of Classification Search
CPC ............ C02F 2101/18; C02F 2101/203; C02F 2101/34; C02F 2301/08; C02F 1/0001; C02F 1/64; B01D 21/01; B01D 37/03
See application file for complete search history.

(56) References Cited

U.S. PATENT DOCUMENTS

| | | | | |
|---|---|---|---|---|
| 4,732,609 A | * | 3/1988 | Frey | .......... C22B 3/42 423/100 |
| 2003/0132166 A1 | * | 7/2003 | Rey | .......... C02F 9/00 210/721 |

FOREIGN PATENT DOCUMENTS

| | | | |
|---|---|---|---|
| CN | 114180753 A | | 3/2022 |
| CN | 114380440 A | * | 4/2022 |
| CN | 115043475 A | | 9/2022 |
| JP | H07124570 A | | 5/1995 |
| JP | 2014028356 A | | 2/2014 |

OTHER PUBLICATIONS

English translation of Patent Publication CN 114180753A, published Mar. 15, 2022. (Year: 2022).*
International Search Report for PCT/CN2023/081683 mailed Jun. 7, 2023, ISA/CN.

* cited by examiner

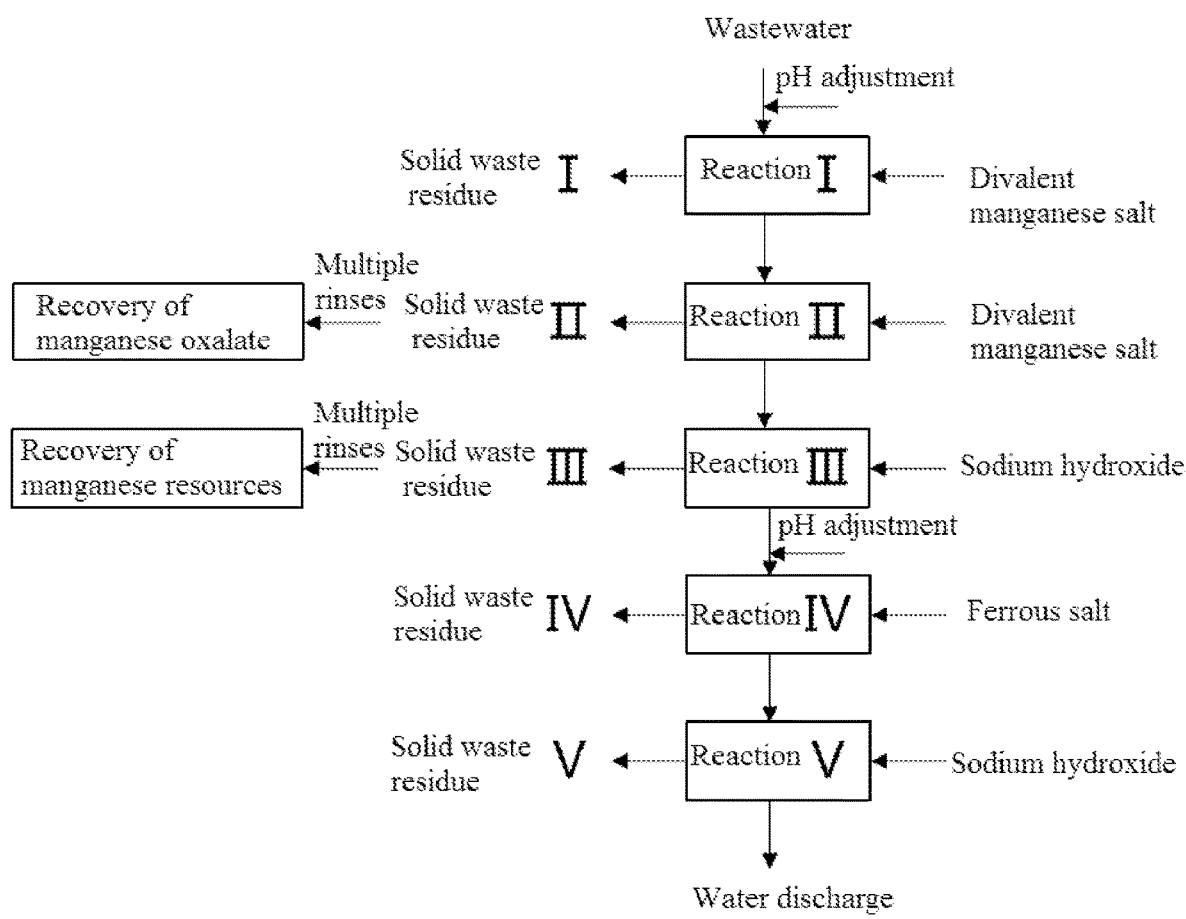

TREATMENT METHOD OF WASTEWATER CONTAINING FERRICYANIDE COMPLEX AND OXALATE

This application is the national phase of International Application No. PCT/CN2023/081683, titled "TREATMENT METHOD OF WASTEWATER CONTAINING FERRICYANIDE COMPLEX AND OXALATE", filed on Mar. 15, 2023, which claims the priority to Chinese Patent Application No. 202210610685.6, titled "TREATMENT METHOD OF WASTEWATER CONTAINING FERRICYANIDE COMPLEX AND OXALATE", filed on May 31, 2022 with the China National Intellectual Property Administration, which are incorporated herein by reference in entirety.

FIELD

The present disclosure relates to the field of wastewater treatment, and in particular to a treatment method of wastewater containing ferricyanide complex and oxalate.

BACKGROUND

With the gradual reduction of energy and mineral resources reserves, researchers from all over the world are actively concerned about the research and development of new energy batteries and the recycling use of resources. In the research of new energy batteries, the sodium electrodes synthesized by raw materials such as one or more hexacyano sodium salts and one or more divalent manganese salts such as manganese chloride, manganese nitrate, manganese sulfate, manganese oxalate, manganese acetate, etc. are of particular interest. In the production process of a certain sodium electrode, wastewater containing ferricyanide complex, oxalate and divalent manganese can be produced.

Cyanide in water is toxic to both human body and natural ecosystem. China stipulates in the Integrated Wastewater Discharge Standard (GB8978-1996) that in general, the concentration of total cyanide in wastewater discharged by enterprises shall not exceed 0.5 mg/L. Compared with other forms of cyanide, ferricyanide, ferrocyanide and cyanide complexed with metal ions are difficult to be treated to meet the requirements of discharge standards by general chemical oxidation method and biological treatment method due to their extremely strong stability, while other high-pressure hydrolysis method and membrane separation method are expensive. Therefore, it is the current focus of many scholars to seek economical and efficient treatment methods of ferricyanide and ferrocyanide.

Oxalate affects the chemical oxygen demand (COD) of wastewater in a form of organic substance in wastewater. Heavy metal ions are also routine indicators in wastewater treatment. Conventional chemical oxidation method and physical adsorption method are used to treat a large amount of oxalate ions and heavy metal ions in wastewater, which not only easily leads to high costs of wastewater treatment, but also leads to a waste of a large amount of oxalate and heavy metal resource. Patent application CN114180753A discloses a treatment method of wastewater containing ferricyanide, ferrocyanide and oxalate, which uses the method of producing precipitation by ferrous ion and ferrocyanide and oxalate in wastewater to achieve the purpose of wastewater treatment. Although the wastewater treated by this method meets the third-level discharge requirements in the Integrated Wastewater Discharge Standard, the waste residue generated during the treatment process is treated as hazardous solid waste because it contains ferricyanide precipitation, which increases the costs of solid waste treatment in wastewater treatment processes.

SUMMARY

The present disclosure aims to solve at least one of the above-mentioned technical problems existing in the prior art. Therefore, the present disclosure provides a treatment method of wastewater containing ferricyanide complex and oxalate, which can efficiently and quickly treat wastewater containing ferricyanide complex and oxalate, and can recover manganese resources.

According to one aspect of the present disclosure, a treatment method of a wastewater containing ferricyanide complex and oxalat is provided, comprising the following steps:

S1: Adjusting the pH of the wastewater to 5-9, then successively adding divalent manganese salt A and flocculant A to the wastewater, and leaving the mixture to stand for settling, and performing solid-liquid separation to obtain a first filtrate; wherein, the wastewater contains ferricyanide complex and oxalate, and the mass of the divalent manganese ions in the added divalent manganese salt A is 5-30 times of the mass of the total cyanide in the wastewater;

S2: Successively adding divalent manganese salt B and flocculant A to the first filtrate, and leaving the mixture to stand for settling, and performing solid-liquid separation to obtain a second filtrate;

S3: Successively adding alkali and flocculant B to the second filtrate, and leaving the mixture to stand for settling, and performing solid-liquid separation to obtain a third filtrate;

S4: Adjusting the pH of the third filtrate to 5-8, then successively adding ferrous salt and flocculant A, and leaving the mixture to stand for settling, and performing solid-liquid separation to obtain a fourth filtrate;

S5: Successively adding alkali and flocculant B to the fourth filtrate, and performing solid-liquid separation to obtain a fifth filtrate.

In some embodiments of the present disclosure, in step S1, the content of total cyanide in the wastewater is 100-2000 mg/L, and the content of COD is 2000-10000 mg/L.

In some embodiments of the present disclosure, in step S1, the wastewater also contains manganese ions. Further, the content of $Mn^{2+}$ in the wastewater is 30-300 mg/L.

In some embodiments of the present disclosure, in step S1, the reagent used for adjusting the pH of the wastewater is at least one of sulfuric acid, hydrochloric acid or nitric acid.

In some embodiments of the present disclosure, the divalent manganese salt A and the divalent manganese salt B are independently at least one of manganese sulfate, manganese chloride or manganese nitrate.

In some embodiments of the present disclosure, the flocculant A is a cationic polyacrylamide solution with a mass concentration of 0.5‰-1.5‰; the flocculant B is an anionic polyacrylamide solution with a mass concentration of 0.5‰-1.5‰. Advantages of flocculant A: cationic polyacrylamide adsorbs multiple negatively charged suspended particles in water on its chains through electrostatic effect, so as to aggregate together the dispersed and small suspended particles, thereby achieving the effect of solid-liquid separation, which is suitable for flocculation of organic wastewater. Advantages of flocculant B: anionic polyacrylamide has negatively charged weakly acidic carboxylic acid groups and strongly acidic sulfonic acid groups, which generate multiple positively charged colloidal particles in wastewater to form bridging adsorption so as to rapidly aggregate together the suspended particles in wastewater, which is suitable for the flocculation of metallurgical wastewater.

In some embodiments of the present disclosure, in step S2, the mass of the divalent manganese ions in the added divalent manganese salt B is 1.4-7 times, preferably 1.4-4 times of the COD in the wastewater.

In some embodiments of the present disclosure, step S2 further comprises performing a rinsing process on the filter residue after the solid-liquid separation.

In some embodiments of the present disclosure, in step S3, the alkali is added to adjust the pH of the second filtrate to 11-13; in step S5, the alkali is added to adjust the pH of the fourth filtrate to 11-13.

In some embodiments of the present disclosure, step S3 further comprises performing a rinsing process on the filter residue after the solid-liquid separation.

In some embodiments of the present disclosure, in step S4, the addition amount of the ferrous salt is 5 g/L-30 g/L of the third filtrate.

In some embodiments of the present disclosure, in step S4, the ferrous salt is at least one of ferrous sulfate, ferrous chloride or ferrous nitrate.

In some embodiments of the present disclosure, in step S5, the content of total cyanide in the fifth filtrate is ≤0.5 mg/L, and the content of COD is ≤500 mg/L, and the content of $Mn^{2+}$ is ≤0.5 mg/L.

In some embodiments of the present disclosure, step S5 further comprises adjusting the pH of the fifth filtrate to 6-9.

According to a preferred embodiment of the present disclosure, it has at least the following beneficial effects:

1. In the present disclosure, under the condition of weak acidity to weak alkalinity, firstly an appropriate amount of divalent manganese ions are added to make the divalent manganese ions combined with ferrocyanide ions and part of oxalate ions in the wastewater to generate mixed slag mainly composed of manganese ferrocyanide, and solid-liquid separation is performed to achieve the purpose of removing most of the cyanide and a small amount of organic substance; then excess divalent manganese ions are added to the first filtrate to make the divalent manganese ions fully combined with the oxalate in the wastewater to form a precipitate, and solid-liquid separation is performed to achieve the purpose of removing organic substance, preferably, the precipitates obtained by the separation are rinsed, and the manganese oxalate resource is recovered; then an appropriate amount of alkali is added to the second filtrate to make hydroxide act with the excess divalent manganese ions in the second filtrate to form a precipitate, the precipitate obtained after the separation is rinsed to achieve the purpose of recovering manganese; then an appropriate amount of ferrous salt is added to the third filtrate under the condition of weak acidity to weak alkalinity to make the ferrous ions combined with the remaining cyanide and oxalate ions to form a precipitate, and solid-liquid separation is performed to achieve the purpose of removing the remaining cyanide and organic substance; finally, an appropriate amount of alkali is added to make the hydroxide act with the remaining ferrous ions in the wastewater to generate a precipitate, and solid-liquid separation is performed to achieve the purpose of removing excess ferrous ions in the fourth filtrate.

2. The treatment method of the present disclosure can treat ferricyanide complex and oxalate ions simultaneously, efficiently and fast. The content of the total cyanide of the wastewater after treatment is less than 0.5 mg/L, and the COD is less than 500 mg/L, and the $Mn^{2+}$ content is less than 0.5 mg/L, which meets the third-level standard discharge requirements stipulated in the "Integrated Wastewater Discharge Standard" (GB8978-1996).

3. The reagents used in the present disclosure are conventional and easy to obtain, and expensive equipment investment is not necessary, for which the present disclosure has low cost and is easy to be promoted.

4. The content of manganese ions in the wastewater of the present disclosure is relatively small, and the manganese ions are in a state of relative equilibrium with the ferrocyanide and oxalate in the wastewater. Although there is a reaction between them at this time, the process is slow. The addition of manganese ions in this process can accelerate the reaction process, and most of the ferrocyanide can be removed first by controlling the addition amount of manganese ions and adjusting the pH. Therefore, using divalent manganese salt for precipitation first can reuse the manganese ions in the wastewater and reduce the treatment cost.

5. The manganese oxalate containing a small amount of cyanide generated by the present disclosure can be used for the synthesis of sodium electrode materials, and the excess manganese after treatment can also be recovered for reuse.

6. In the present disclosure, the remaining cyanide and oxalate are finally removed by ferrous salt, so that the total cyanide content of the wastewater is as low as 0.5 mg/L, and the COD is as low as 500 mg/L, which avoids the excessive use of divalent manganese salts and reduces treatment costs.

7. The present disclosure performs resource utilization on both oxalate and manganese ions in the wastewater, which reduces the output of hazardous solid waste in the wastewater treatment process, and reduces the treatment cost of the solid waste residue in the wastewater treatment process.

BRIEF DESCRIPTION OF DRAWINGS

The present disclosure will be further described below in conjunction with the drawings and embodiments, wherein:

FIG. 1 is a process flow chart of the present disclosure.

DETAILED DESCRIPTION

The concept of the present disclosure and the technical effects produced by the present disclosure will be clearly and completely described below with reference to the embodiments, so as to make the purpose, characteristics and effects of the present disclosure fully understood. Obviously, the described embodiments are only a part of the embodiments of the present disclosure, rather than all the embodiments. Based on the embodiments of the present disclosure, other embodiments obtained by those skilled in the art without creative efforts are all within the protection scope of the present disclosure.

Example 1

A treatment method of wastewater containing ferricyanide complex and oxalate, with reference to FIG. 1, the specific process is:

(1) 400 mL of wastewater containing ferricyanide complex and oxalate was taken and added with 30% dilute sulfuric acid to adjust the pH of the wastewater to 7-8;
(2) Then 7 g of manganese sulfate monohydrate was taken and stirred to react for 60 min, and then added with 3 mL of cationic polyacrylamide solution with a mass concentration of 1‰. The mixture was stirred for 5 min, left to stand for settling, and solid-liquid separated to obtain a first filtrate;
(3) 12 g manganese sulfate monohydrate was added to the first filtrate and stirred to react for 60 min, then added with 2 mL of cationic polyacrylamide solution with a mass concentration of 1‰. The mixture was stirred for 5 min, left to stand for settling, and solid-liquid separated to obtain a second filtrate. The precipitate obtained by separation was rinsed five times to recover the manganese oxalate resource;
(4) 10 mL of 30% sodium hydroxide solution was added to the second filtrate to stabilize the pH of the second filtrate at 12-13 and stirred to react for 30 min, and then added with 2 mL of anionic polyacrylamide solution with a mass concentration of 1‰. The mixture was stirred for 5 min, and solid-liquid separated to obtain a third filtrate. The precipitate obtained by separation was rinsed five times to recover the manganese resource;
(5) 30% dilute sulfuric acid was added to the third filtrate to adjust the pH of the wastewater to 6-7, and 350 mL of the third filtrate after the value adjustment was taken and added with 7 g ferrous sulfate heptahydrate, stirred to react for 60 min, and then added with 1 mL of cationic polyacrylamide solution with a mass concentration of 1‰. The mixture was stirred for 5 minutes, left to stand for settling, and solid-liquid separated to obtain a fourth filtrate;
(6) 3.5 mL of 30% sodium hydroxide solution was added to the fourth filtrate to stabilize the pH of the fourth filtrate at 12-13, stirred to react for 30 minutes, and then added with 1 mL of anionic polyacrylamide solution with a mass concentration of 1‰. The mixture was stirred for 5 min, and solid-liquid separated to obtain a fifth filtrate. 30% dilute sulfuric acid was added to the fifth filtrate to adjust the pH of the wastewater to 7.5, and then the wastewater could be discharged. The main components of the wastewater before and after treatment are shown in Table 1.

TABLE 1

Main components of wastewater before and after treatment in Example 1

| Water sample | $CN_T$ (mg/L) | COD (mg/L) | $Mn^{2+}$ (mg/L) | pH |
|---|---|---|---|---|
| Before treatment | 499.93 | 5118.00 | 80.55 | 9.7 |
| The first filtrate | 6.30 | 4620.00 | 2886.00 | 7.6 |
| The second filtrate | 5.46 | 1804.00 | 1938.50 | 7.3 |
| After treatment | 0.20 | 251.50 | 0.0075 | 7.5 |

Table 1 shows that the cyanide of the first filtrate has been mostly removed, while the COD content is still high, indicating that at a specific pH, with addition of an appropriate amount of divalent manganese salt, the ferrocyanide in the system precipitates first, but only a small amount of oxalate precipitates. In addition, the content of COD in the second filtrate is also related to the content of Mn in the solution.

Example 2

A treatment method of wastewater containing ferricyanide complex and oxalate, the specific process is:

(1) 400 mL of wastewater containing ferricyanide complex and oxalate was taken and added with 30% dilute sulfuric acid to adjust the pH of the wastewater to 6-7;
(2) Then 8 g of manganese sulfate monohydrate was taken and stirred to react for 60 min, and then added with 2 mL of cationic polyacrylamide solution with a mass concentration of 1‰. The mixture was stirred for 5 min, left to stand for settling, and solid-liquid separated to obtain a first filtrate;
(3) 12 g manganese sulfate monohydrate was added to the first filtrate and stirred to react for 60 min, then added with 2 mL of cationic polyacrylamide solution with a mass concentration of 1‰. The mixture was stirred for 5 min, left to stand for settling, and solid-liquid separated to obtain a second filtrate. The precipitate obtained by separation was rinsed five times to recover the manganese oxalate resource;
(4) 10 mL of 30% sodium hydroxide solution was added to the second filtrate to stabilize the pH of the second filtrate at 12-13 and stirred to react for 30 min, and then added with 1 mL of anionic polyacrylamide solution with a mass concentration of 1‰. The mixture was stirred for 5 min, and solid-liquid separated to obtain a third filtrate. The precipitate obtained by separation was rinsed five times to recover the manganese resource;
(5) 30% dilute sulfuric acid was added to the third filtrate to adjust the pH of the wastewater to 6-7, and 350 mL of the third filtrate after the value adjustment was taken and added with 1.75 g ferrous sulfate heptahydrate, stirred to react for 60 min, and then added with 1 mL of cationic polyacrylamide solution with a mass concentration of 1‰. The mixture was stirred for 5 minutes, left to stand for settling, and solid-liquid separated to obtain a fourth filtrate;
(6) 3.5 mL of 30% sodium hydroxide solution was added to the fourth filtrate to stabilize the pH of the fourth filtrate at 12-13, stirred to react for 30 minutes, and then added with 1 mL of anionic polyacrylamide solution with a mass concentration of 1‰. The mixture was stirred for 5 min, and solid-liquid separated to obtain a fifth filtrate. 30% dilute sulfuric acid was added to the fifth filtrate to adjust the pH of the wastewater to 7.3, and then the wastewater could be discharged. The main components of the wastewater before and after treatment are shown in Table 2.

TABLE 2

Main components of wastewater before and after treatment in Example 2

| Water sample | $CN_T$ (mg/L) | COD (mg/L) | $Mn^{2+}$ (mg/L) | pH |
|---|---|---|---|---|
| Before treatment | 1055.00 | 5940.00 | 237.90 | 9.0 |
| The first filtrate | 7.20 | 5020.00 | 2369.00 | 6.5 |
| The second filtrate | 6.44 | 1544.00 | 1732.25 | 6.3 |
| After treatment | 0.40 | 452.90 | 0.0070 | 7.3 |

Example 3

A treatment method of wastewater containing ferricyanide complex and oxalate, the specific process is:

(1) 400 mL of wastewater containing ferricyanide complex and oxalate was taken and added with 30% dilute sulfuric acid to adjust the pH of the wastewater to 7-8;

(2) Then 8 g of manganese sulfate monohydrate was taken and stirred to react for 60 min, and then added with 3 mL of cationic polyacrylamide solution with a mass concentration of 1‰. The mixture was stirred for 5 min, left to stand for settling, and solid-liquid separated to obtain a first filtrate;

(3) 13 g manganese sulfate monohydrate was added to the first filtrate and stirred to react for 60 min, then added with 2 mL of cationic polyacrylamide solution with a mass concentration of 1‰. The mixture was stirred for 5 min, left to stand for settling, and solid-liquid separated to obtain a second filtrate. The precipitate obtained by separation was rinsed five times to recover the manganese oxalate resource;

(4) 10 mL of 30% sodium hydroxide solution was added to the second filtrate to stabilize the pH of the second filtrate at 12-13 and stirred to react for 30 min, and then added with 2 mL of anionic polyacrylamide solution with a mass concentration of 1‰. The mixture was stirred for 5 min, and solid-liquid separated to obtain a third filtrate. The precipitate obtained by separation was rinsed five times to recover the manganese resource;

(5) 30% dilute sulfuric acid was added to the third filtrate to adjust the pH of the wastewater to 6-7, and 350 mL of the third filtrate after the value adjustment was taken and added with 3.5 g ferrous sulfate heptahydrate, stirred to react for 60 min, and then added with 1 mL of cationic polyacrylamide solution with a mass concentration of 1‰. The mixture was stirred for 5 min, left to stand for settling, and solid-liquid separated to obtain a fourth filtrate;

(6) 3.5 mL of 30% sodium hydroxide solution was added to the fourth filtrate to stabilize the pH of the fourth filtrate at 12-13, stirred to react for 30 min, and then added with 1 mL of anionic polyacrylamide solution with a mass concentration of 1‰. The mixture was stirred for 5 min, and solid-liquid separated to obtain a fifth filtrate. 30% dilute sulfuric acid was added to the fifth filtrate to adjust the pH of the wastewater to 7.0, and then the wastewater could be discharged. The main components of the wastewater before and after treatment are shown in Table 3.

TABLE 3

Main components of wastewater before and after treatment in Example 3

| Water sample | $CN_T$ (mg/L) | COD (mg/L) | $Mn^{2+}$ (mg/L) | pH |
|---|---|---|---|---|
| Before treatment | 266.63 | 4088.00 | 77.43 | 8.8 |
| The first filtrate | 6.50 | 3528.00 | 2579.00 | 7.2 |
| The second filtrate | 4.95 | 2144.10 | 2332.50 | 7.1 |
| After treatment | 0.1 | 163.20 | 0.0054 | 7.0 |

Comparative Example 1

A treatment method of wastewater containing ferricyanide complex and oxalate, which is different from Example 1 in that the addition amount of ferrous salt was less than 5 g/L. The specific process is:

(1) 400 mL of wastewater containing ferricyanide complex and oxalate was taken and added with 30% dilute sulfuric acid to adjust the pH of the wastewater to 7-8;

(2) Then 7 g of manganese sulfate monohydrate was taken and stirred to react for 60 min, and then added with 3 mL of cationic polyacrylamide solution with a mass concentration of 1‰. The mixture was stirred for 5 min, left to stand for settling, and solid-liquid separated to obtain a first filtrate;

(3) 12 g manganese sulfate monohydrate was added to the first filtrate and stirred to react for 60 min, then added with 2 mL of cationic polyacrylamide solution with a mass concentration of 1‰. The mixture was stirred for 5 min, left to stand for settling, and solid-liquid separated to obtain a second filtrate. The precipitate obtained by separation was rinsed five times to recover the manganese oxalate resource;

(4) 10 mL of 30% sodium hydroxide solution was added to the second filtrate to stabilize the pH of the second filtrate at 12-13 and stirred to react for 30 min, and then added with 2 mL of anionic polyacrylamide solution with a mass concentration of 1‰. The mixture was stirred for 5 min, and solid-liquid separated to obtain a third filtrate;

(5) 30% dilute sulfuric acid was added to the third filtrate to adjust the pH of the wastewater to 6-7, and 350 mL of the third filtrate after the value adjustment was taken and added with 0.7 g ferrous sulfate heptahydrate, stirred to react for 60 min, and then added with 1 mL of cationic polyacrylamide solution with a mass concentration of 1‰. The mixture was stirred for 5 min, left to stand for settling, and solid-liquid separated to obtain a fourth filtrate;

(6) 3.5 mL of 30% sodium hydroxide solution was added to the fourth filtrate to stabilize the pH of the fourth filtrate at 12-13, stirred to react for 30 min, and then added with 1 mL of anionic polyacrylamide solution with a mass concentration of 1‰. The mixture was stirred for 5 min, and solid-liquid separated to obtain a fifth filtrate. 30% dilute sulfuric acid was added to the fifth filtrate to adjust the pH of the wastewater to 7.3, and then the wastewater could be discharged. The main components of the wastewater before and after treatment are shown in Table 4.

TABLE 4

Main components of wastewater before and after treatment in Comparative example 1

| Water sample | $CN_T$ (mg/L) | COD (mg/L) | $Mn^{2+}$ (mg/L) | pH |
|---|---|---|---|---|
| Before treatment | 499.93 | 5118.00 | 80.55 | 9.7 |
| The first filtrate | 6.30 | 4620.00 | 2886.00 | 7.6 |
| The second filtrate | 5.46 | 1804.00 | 1938.50 | 7.3 |
| After treatment | 1.44 | 273.50 | 0.0072 | 7.3 |

In Comparative example 1, the addition amount of ferrous salt was less than 5 g/L, and the total cyanide concentration in the wastewater could not be treated to meet the third-level standard discharge requirements stipulated in the "Integrated Wastewater Discharge Standard" (GB8978-1996).

Comparative Example 2

A treatment method of wastewater containing ferricyanide complex and oxalate, which is different from Example 2 in that there was no step (3). The specific process is:

(1) 400 mL of wastewater containing ferricyanide complex and oxalate was taken and added with 30% dilute sulfuric acid to adjust the pH of the wastewater to 6-7;

(2) Then 8 g of manganese sulfate monohydrate was taken and stirred to react for 60 min, and then added with 3 mL of cationic polyacrylamide solution with a mass concentration of 1‰. The mixture was stirred for 5 min, left to stand for settling, and solid-liquid separated to obtain a first filtrate;

(3) 10 mL of 30% sodium hydroxide solution was added to the first filtrate to stabilize the pH of the first filtrate at 12-13 and stirred to react for 30 min, and then added with 2 mL of anionic polyacrylamide solution with a mass concentration of 1‰. The mixture was stirred for 5 min, and solid-liquid separated to obtain a second filtrate;

(4) 30% dilute sulfuric acid was added to the second filtrate to adjust the pH of the wastewater to 6-7, and 350 mL of the second filtrate after the value adjustment was taken and added with 1.75 g ferrous sulfate heptahydrate, stirred to react for 60 min, and then added with 1 mL of cationic polyacrylamide solution with a mass concentration of 1‰. The mixture was stirred for 5 min, left to stand for settling, and solid-liquid separated to obtain a third filtrate;

(5) 3.5 mL of 30% sodium hydroxide solution was added to the third filtrate to stabilize the pH of the third filtrate at 12-13, stirred to react for 30 min, and then added with 1 mL of anionic polyacrylamide solution with a mass concentration of 1‰. The mixture was stirred for 5 min, and solid-liquid separated to obtain a fourth filtrate. 30% dilute sulfuric acid was added to the fourth filtrate to adjust the pH of the wastewater to 7.3, and then the wastewater could be discharged. The main components of the wastewater before and after treatment are shown in Table 5.

TABLE 5

Main components of wastewater before and after treatment in Comparative example 2

| Water sample | $CN_T$ (mg/L) | COD (mg/L) | $Mn^{2+}$ (mg/L) | pH |
|---|---|---|---|---|
| Before treatment | 1055.00 | 5940 | 111.9 | 9.0 |
| The first filtrate | 7.20 | 5020.00 | 2369.00 | 6.5 |
| After treatment | 4.75 | 3515 | 0.0065 | 7.3 |

In Comparative example 2, manganese sulfate monohydrate was not added for the second time, and the concentration of total cyanide and COD in the wastewater could not be treated to meet the third-level standard discharge requirements stipulated in the "Integrated Wastewater Discharge Standard" (GB8978-1996).

The embodiments of the present disclosure have been described in detail above in conjunction with the drawings, but the present disclosure is not limited to the above-mentioned embodiments, Within the scope of knowledge possessed by those of ordinary skill in the art, various changes can also be made without departing from the spirit of the present disclosure. Furthermore, the embodiments and the features in the embodiments of the present disclosure may be combined with each other without conflict.

The invention claimed is:

1. A treatment method of wastewater containing ferricyanide complex and oxalate, comprising the following steps:

S1: adjusting the pH of the wastewater to 5-9, then adding divalent manganese salt A to the wastewater, stirring for reaction, and adding flocculant A cationic polyacrylamide to obtain a first mixture, and leaving the first mixture to stand for settling, and performing solid-liquid separation to obtain a first filtrate and a manganese (II) hexacyanoferrate (II)-based mixed residue; wherein the wastewater contains ferricyanide complex and oxalate, and the mass of the divalent manganese ions in the added divalent manganese salt A is 5-30 times of the mass of total cyanide in the wastewater;

S2: adding divalent manganese salt B to the first filtrate, stirring for reaction, and adding flocculant A cationic polyacrylamide to obtain a second mixture, and leaving the second mixture to stand for settling, and performing solid-liquid separation to obtain a second filtrate and a first filter residue, and performing a rinsing process on the first filter residue to recover manganese oxalate; wherein the mass of the divalent manganese ions in the added divalent manganese salt B per liter of the wastewater is 1.4-7 times of COD in the wastewater;

S3: adding alkali to the second filtrate to adjust the pH of the second filtrate to 11-13, stirring for reaction, and adding flocculant B anionic polyacrylamide to obtain a third mixture, and leaving the third mixture to stand for settling, and performing solid-liquid separation to obtain a third filtrate and a second filter residue, and performing a rinsing process on the second filter residue to recover manganese residue;

S4: adjusting the pH of the third filtrate to 5-8, then adding ferrous salt, stirring for reaction, and adding flocculant A cationic polyacrylamide to obtain a fourth mixture, and leaving the fourth mixture to stand for settling, and performing solid-liquid separation to obtain a fourth filtrate; wherein the addition amount of the ferrous salt is 5-30 g/L of the third filtrate; and, S5: adding alkali to the fourth filtrate to adjust the pH of the fourth filtrate to 11-13, stirring for reaction, and adding flocculant B anionic polyacrylamide, and performing solid-liquid separation to obtain a fifth filtrate.

2. The treatment method according to claim 1, wherein in step S1, concentration of total cyanide in the wastewater is 100-2000 mg/L, and concentration of COD is 2000-10000 mg/L.

3. The treatment method according to claim 1, wherein the divalent manganese salt A and the divalent manganese salt B are each independently selected from the group consisting of manganese sulfate, manganese chloride, manganese nitrate and a combination thereof.

4. The treatment method according to claim 1, wherein the flocculant A is a cationic polyacrylamide solution with a mass concentration of 0.5%-1.5%; and, the flocculant B is an anionic polyacrylamide solution with a mass concentration of 0.5%-1.5%.

5. The treatment method according to claim 1, wherein in step S5, concentration of total cyanide in the fifth filtrate is ≤0.5 mg/L, concentration of COD is ≤500 mg/L of the wastewater, and concentration of $Mn^{2+}$≤0.5 mg/L of the wastewater.

* * * * *